(12) United States Patent  
Chavrot (10) Patent No.: US 9,704,607 B2  
(45) Date of Patent: Jul. 11, 2017

(54) HIGHLY SAFE CONTROL MECHANISM FOR A DEVICE FOR THE SEALED TRANSFER BETWEEN TWO CLOSED SPACES

(71) Applicant: Gettinge La Calhene, Vendome (FR)

(72) Inventor: Bernard Chavrot, Athee sur Cher (FR)

(73) Assignee: GETINGE LA CALHENE, Vendome (FR)

( * ) Notice: Subject to any disclaimer, the term of this patent is extended or adjusted under 35 U.S.C. 154(b) by 519 days.

(21) Appl. No.: 14/350,878

(22) PCT Filed: Oct. 11, 2012

(86) PCT No.: PCT/EP2012/070194  
§ 371 (c)(1),  
(2) Date: Apr. 10, 2014

(87) PCT Pub. No.: WO2013/053844  
PCT Pub. Date: Apr. 18, 2013

(65) Prior Publication Data  
US 2014/0291995 A1 Oct. 2, 2014

(30) Foreign Application Priority Data  
Oct. 14, 2011 (FR) ...................................... 11 59327

(51) Int. Cl.  
*E05B 65/00* (2006.01)  
*G21F 7/005* (2006.01)  
(Continued)

(52) U.S. Cl.  
CPC .............. *G21F 7/005* (2013.01); *F16J 13/18* (2013.01); *B01L 1/02* (2013.01); *Y10T 292/0836* (2015.04); *Y10T 292/0844* (2015.04)

(58) Field of Classification Search  
CPC ............... Y10T 292/20; Y10T 292/202; Y10T 292/225; Y10T 292/183; Y10T 292/189;  
(Continued)

(56) References Cited

U.S. PATENT DOCUMENTS 3,682,208 A 8/1972 Fedi et al.  
4,494,586 A * 1/1985 Picard ..................... G21F 7/005  
141/384  
(Continued)

FOREIGN PATENT DOCUMENTS

EP 2091051 A1 8/2009  
FR 2695343 A1 3/1994  
WO 2014/076208 A1 5/2014

OTHER PUBLICATIONS

International Search Report for PCT/EP2012/070194 dated Jan. 21, 2013.  
(Continued)

*Primary Examiner* — Alyson M Merlino  
(74) *Attorney, Agent, or Firm* — Pearne & Gordon, LLP (57) ABSTRACT

A control mechanism for a device for the sealed transfer between a chamber and a container, affording a very high level of safety, comprising bolts able to open the doors in complete safety, and a protective bolt (92) able to prevent an opening movement if an attempt is made to remove the container.

12 Claims, 9 Drawing Sheets

(51) Int. Cl.
*F16J 13/18* (2006.01)
*E05C 3/04* (2006.01)
*B01L 1/02* (2006.01)

(58) Field of Classification Search
CPC ........... Y10T 292/109; Y10T 292/1092; Y10T 292/1093; Y10T 292/195; Y10T 292/1039; Y10T 292/1041; B65D 45/00; B65D 45/16; B65D 45/20; B65D 45/02; B65D 43/16; B65D 43/163; B65D 43/166; G21F 7/005; G21F 7/047; F16J 13/18; B01L 1/02
USPC .................... 14/383, 384, 386; 220/324, 318
See application file for complete search history.

(56) References Cited

U.S. PATENT DOCUMENTS

| | | |
|---|---|---|
| 5,421,626 A | 6/1995 | Glachet |
| 2014/0230963 A1 | 8/2014 | Simon |

OTHER PUBLICATIONS

Written Opinion for PCT/EP2012/070194.
Search Report issued in French Patent Application No. FR 11 59327 dated Aug. 1, 2012.
U.S. Appl. No. 14/384,787, "Sealed Mounting Device of an Interchangeable Member on an Extra Strong Containment Enclosure", filed Sep. 12, 2014.

* cited by examiner

HIGHLY SAFE CONTROL MECHANISM FOR A DEVICE FOR THE SEALED TRANSFER BETWEEN TWO CLOSED SPACES

TECHNICAL FIELD AND PRIOR ART

The present invention relates to a highly safe control mechanism for a device for the sealed transfer between two closed spaces, and to a device for the sealed transfer between two closed spaces.

In a number of industrial sectors, of which the nuclear, medical, pharmaceutical and food production sectors will be mentioned, it is necessary or desirable to undertake certain tasks in a confined atmosphere, either to protect personnel, for example from radioactivity or toxicity, for example, or on the contrary to be able to undertake these tasks in an aseptic atmosphere, or one which is dust-free, or indeed in an atmosphere with both these characteristics simultaneously.

Transferring a device or a product from one closed space to another without the seal of each of these spaces with regard to the exterior being broken at any time poses a problem which is difficult to solve. This problem may be resolved by a device with a double-door connection.

Such a double-door device equipped with a control with multiple safeties is, for example, known from document FR 2 695 343. Each space is closed by a door installed in a flange. Each door is securely attached to its flange by a bayonet connection, and the two flanges are configured to be securely attached to one another by a bayonet connection.

If one of the closed spaces is formed by a container and the other space by a glove box, the transfer is accomplished as follows. The flange of the container comprises lugs on its outer periphery, which lugs will fit into a recess in the flange of the glove box. The flange of the container is introduced into the flange of the glove box, and the container is aligned such that the lugs are matched with the recess. A first rotation of the container around its door's axis enables the flange of the container to be securely attached to the flange of the glove box by the bayonet connection. The door of the container is pivoted relative to the container by a second rotation of the container, around the same axis, in the same direction as the first rotation, this second rotation ensuring simultaneously the secured attachment of the door of the container to the door of the glove box by another bayonet connection, and the disconnection of the new assembly formed by the two bracketed doors from the flanges of the door and glove box. A safety mechanism is unlocked by a grip control in the glove box, making a passage between the two spaces. In the case of an aseptic atmosphere, where the outer faces of both doors are in contact with one another in a sealed fashion, they cannot contaminate the interior of the spaces.

The safety mechanism comprises a first bolt blocking the control in its closed position if the container has no door, while a second bolt blocks the control in its closed position until the flange of the container is locked on the flange of the glove box, and while a third bolt prevents the two flanges from becoming disconnected when the control is in a position between open and closed and, finally, while a fourth bolt prevents the control member from returning to its closed position after the first door has become separated. The combination of these bolts affords a very high level of safety when opening the glove box. However, it is desirable, in a general sense, to increase still further the device's level of safety, particularly to prevent any risk of failure of tightness due to a malicious action.

DESCRIPTION OF THE INVENTION

It is, consequently, one aim of the present invention to provide a mechanism affording an even higher level of safety than the mechanism of the state of the art.

The aim of the present invention is attained by a control mechanism comprising the four bolts described above and an additional bolt, which will be "activated" after the second bolt is unlocked, and before the third bolt is locked, if the flange of the container leaves its locked position on the flange of the chamber. The function of this additional bolt is to prevent the control means being operated again, in the direction of separation of the door of the chamber.

Very advantageously, this additional bolt comprises a first portion which is similar to the portion of the second bolt installed in the movable control member, positioned upstream of the latter in the direction of rotation of the movable control member, for opening, and uses the portion of the second bolt located in the flange of the chamber. The robustness of the structure of this additional bolt has already been tried and tested, only a small number of parts must be added, and it is simple to fit it to existing devices.

The subject-matter of the present invention is, then, a centralised control mechanism, with integrated safeties, for a device for the sealed transfer between two closed spaces, where this device comprises a first flange and second flange which can be securely attached to one another by a first bayonet connection, and a first door and a second door normally plugging openings respectively delimited by the first flange and the second flange, and which can be securely attached to one another by a second bayonet connection, where this control mechanism comprises:

a movable control member, installed on the first flange such that it is able move between a closed position and an open position, passing through an intermediate locking position, a system of ramps interposed between the control member and the first door, in order to separate the latter from the first flange when the control member moves from its locked position to its open position, a first bolt normally blocking the control member in its closed position, and which is automatically unlocked by the presence of the second door against the first door, a second bolt normally blocking the control member in its closed position, and which is automatically unlocked when the second flange is securely attached to the first flange by the first bayonet connection, a third bolt which is normally unlocked when the control member is in its closed position, and which automatically blocks the first bayonet connection in a condition of secure attachment of the first and second flanges when the control member is between its locked and open positions, or in one of these positions, a fourth bolt, which is normally unlocked when the control member is in its closed position, and which automatically acts to prevent this member returning to its closed position, after a separation of the first door controlled by the system of ramps, when the control member is between its locked and open positions, or in one of these positions, where the centralised control mechanism also comprises a protective bolt which is normally unlocked in the closed position and in the open position of the control member, and which can block the control member when the second flange is not at least completely locked on the first flange between the time when the second bolt is in the unlocked position, and before the time when the third bolt blocks the first bayonet connection in a condition of secure attachment of the first and second flanges, so as to prevent the first door from opening.

In one example embodiment the second bolt comprises a first blocking rod installed such that it is able to slide in a hole in the control member; where first elastic means act so as to move this blocking rod towards the first flange, so as to insert it partially into a through-hole made in this flange, when the control member is in its closed position; and a second control rod installed such that it is able to slide in this through-hole, such that it protrudes from a face of the first flange facing the second flange, in a position such that this control rod is pushed away, allowing the control member to rotate, only when the first bayonet connection is locked.

In a particularly advantageous manner, the protective bolt comprises a third blocking rod installed such that it is able to slide in a hole of the control member, where a third elastic means acts so as to move the third blocking rod towards the first flange, where the third blocking rod and the third hole are positioned upstream of the first blocking rod in the direction of opening of the control member, such that the third blocking rod is partially inserted into the through-hole of the second bolt, when the control member is in an intermediate position; and such that the second flange is not completely locked so as to prevent it from rotating on the first flange.

The third blocking rod preferably comprises a longitudinal end pointing towards the first flange, where said longitudinal end has a face which is inclined such that said face causes the third blocking rod to be retracted into the control member when the control member moves towards its closed position.

The first bolt comprises, for example, a first movable blocking member supported by the first door on the side opposite the second door, which blocking member are configured to 38 cooperate with the control member, and a control rod which can cooperate with the blocking member when the blocking member is in its closed position, and when the second door does not push the control rod away, blocking the control member.

The third bolt comprises, for example, a second blocking rod installed such that it is able to slide in a second hole of the first flange, where at least one cam surface against which one end of this second blocking rod is pressed is formed on the control member, such that the end opposite the second blocking rod is concealed in the second hole when the control member is in a closed position, and protrudes from one face of the first flange facing the second flange, in a position such that it blocks the first bayonet connection in a locked state, when the control member is between the locked and open positions, or in one of these positions.

The fourth bolt comprises a blocking pin installed such that it is able to slide in a hole of the first flange, where elastic means act so as to press the blocking pin against a face opposite the control member, where a trapping groove is formed in this opposite face, in such a way that it is located opposite the blocking pin when the control member is between the locked and open positions or in one of these positions, and where a support surface is connected to the first door, holding the blocking pin completely in the hole of the first flange until the first door has separated from the first flange.

The system of ramps may comprise two parallel ramps, opposite one another, connected to the first door, and a roller supported by the control member and cooperating simultaneously with both these parallel ramps.

The support surface and the parallel ramps may be formed on a part able which can attached to a face of the first door opposite the second door, where this part also supports the first bolt.

The control member is, for example, a pivoting member, installed on a face of the first flange opposite the second flange by a pivoting shaft. The first blocking rod and the third blocking rod are then located at the same distance from the control member's axis of rotation.

BRIEF DESCRIPTION OF THE ILLUSTRATIONS

The present invention will be better understood by means of the description which follows and the appended illustrations, in which.

DETAILED DESCRIPTION OF PARTICULAR EMBODIMENTS

In the embodiment illustrated in the figures the two closed spaces which it is desired to connect using a double-door sealed transfer device fitted with a centralised control mechanism with incorporated safeties in accordance with the invention are, respectively, a confinement cell 10 and a container 12. It will be understood, however, that the invention is also applicable if the closed spaces are, for example, in one case a glove box and in the other a container or two glove boxes.

Figure 1:
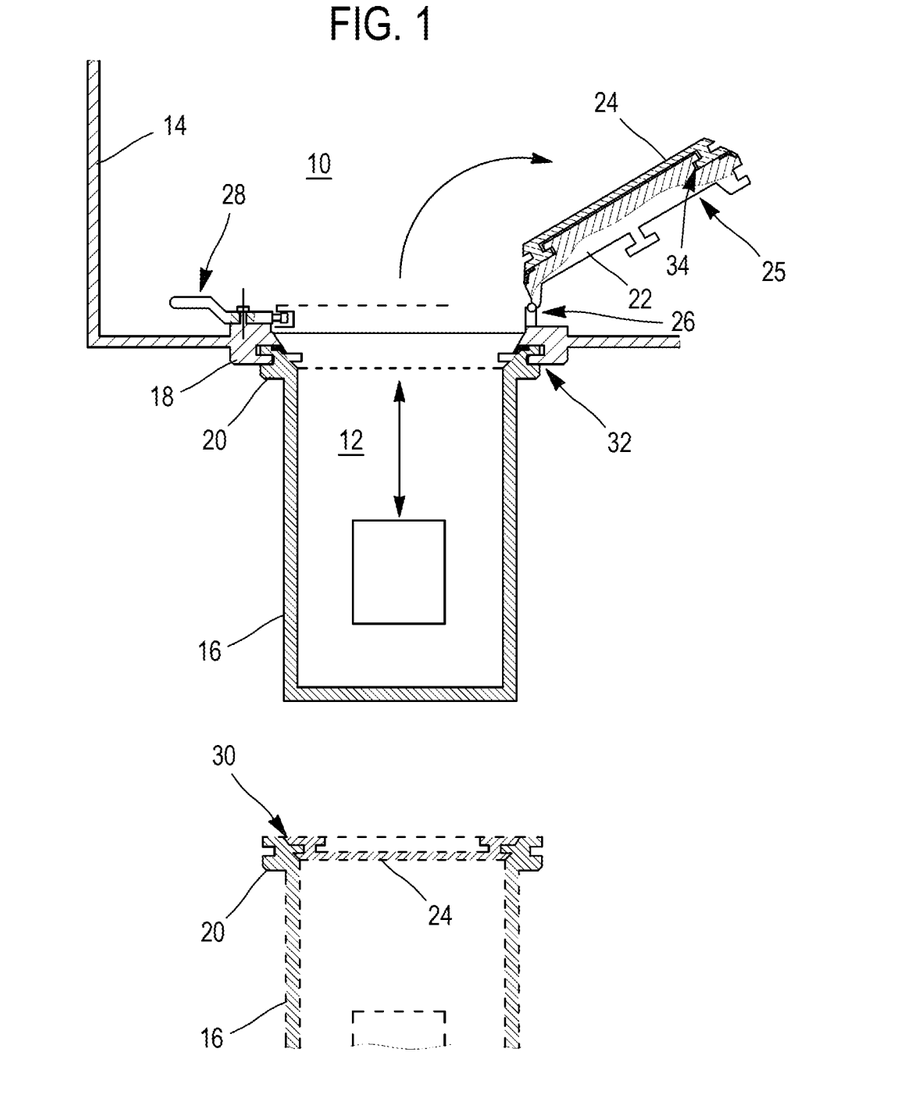
FIG. 1 is a longitudinal section view illustrating diagrammatically how a container is connected to a cell by means of a double-door sealed transfer device fitted with a centralised control mechanism in accordance with the invention.
Figure 2:
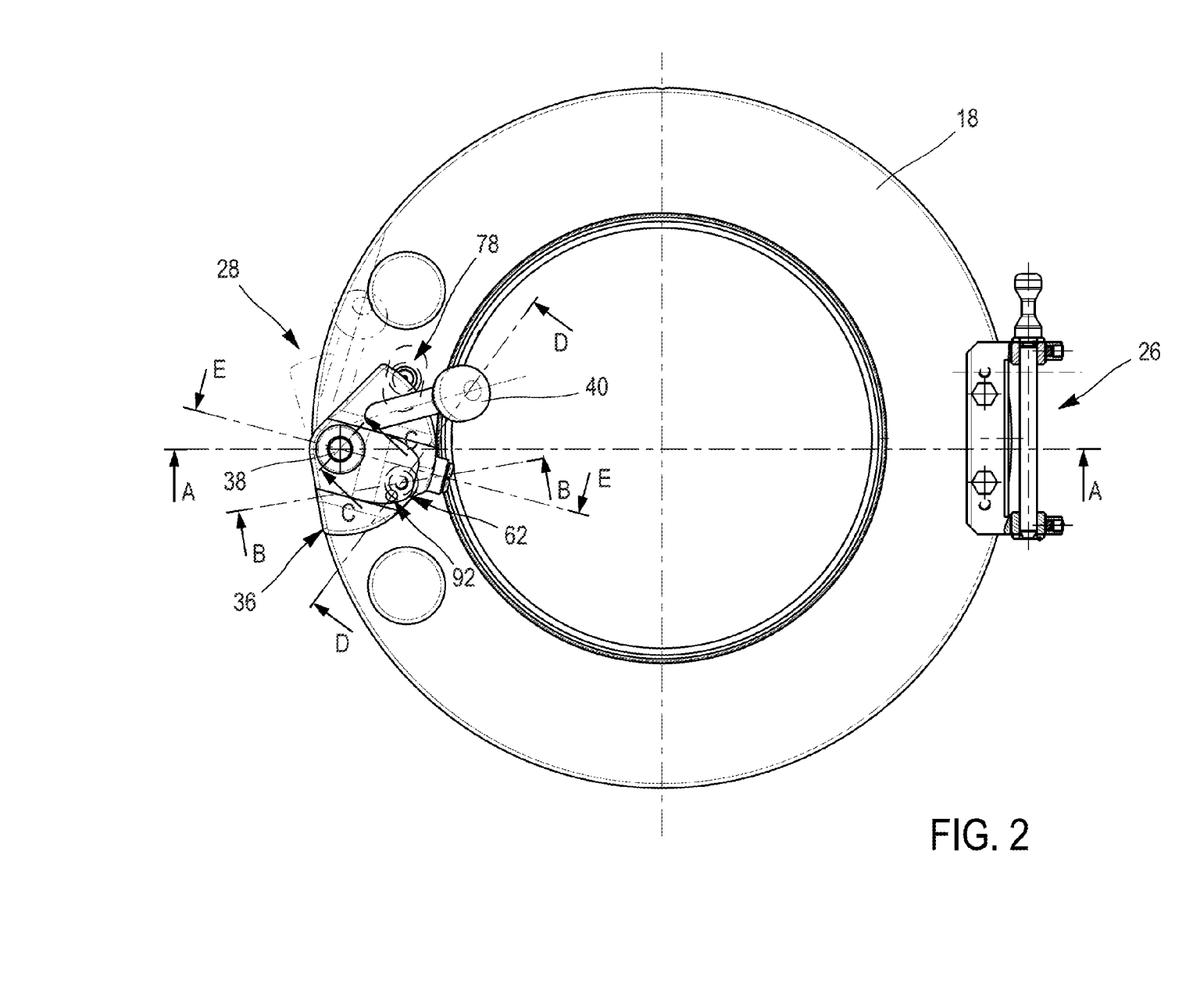
FIG. 2 is a front view, from inside the cell, of the centralised control mechanism, from which the door of the cell is omitted.

Cell 10 is delimited by a wall 14, only a part of which is visible in the figures. It is fitted, in conventional fashion, with remote handling means such as telemanipulators and/or gloves (not represented) which are securely attached to wall 14, by means of which the centralised control mechanism can be operated from inside this cell 10. Container 12 is also delimited by a wall 16, as illustrated in particular in FIG. 1.

The double-door sealed transfer device in which the centralised control mechanism is used mainly comprises a cell flange 18, a container flange 20, a cell door 22 normally plugging a circular opening delimited by cell flange 18, and a container door 24 normally plugging an opening delimited by container flange 20. Cell flange 18 and container flange 20 are attached respectively to wall 14 and cell 10 and to wall 16 of container 12. The door of cell 22 is connected in articulated fashion to cell flange 18 by a hinge 26.

In a position diametrically opposite this hinge 26, a centralised control mechanism, designated in a general manner by reference 28, allows, in accordance with the invention, the opening and closure of doors 22 and 24 to be controlled, and also of the safeties incorporated into this mechanism 28, when container 12 has been installed on cell 10. Container door 24 is attached to container flange 20 by a bayonet connection 30.

To enable container flange 20 to be securely attached to cell flange 18 and container door 24 to be securely attached to cell door 22, the double-door sealed transfer device also comprises two other bayonet connections, designated respectively by references 32 and 34. The three bayonet connections 30, 32 and 34 are positioned such that after container flange 20 is positioned against cell flange 18, the effect of container 12 rotating around its axis, for example in a clockwise direction, is to securely attach container flange 20 with cell flange 18, to securely attach container door 24 with cell door 22, and to separate container door 24 from container flange 20. These last two operations are undertaken consecutively, such that the container opens only after container door 24 has been securely attached with cell door 22, forming a double door.

Centralised control mechanism 28, with integrated safeties, will now be described in detail, with reference to FIGS. 2 to 9. This control mechanism 28 firstly comprises a movable control member 36, connected in articulated fashion on cell flange 18 by a shaft 38 in the represented embodiment. More specifically, shaft 38 is aligned parallel to the axis of the circular opening delimited by flange 18, and movable control member 36 is in contact with the face of this flange 18 facing the interior of cell 10. Movable control member 36 is fitted with a lever or a handle 40 whereby it may be rotated manually.

In an unrepresented variant embodiment, control member 36 is rotated in an automated fashion by a motor which may be positioned within or outside cell 10. In this case the control of this motor may be directly accessible from outside the cell, without using remote handling means.

The centralised control mechanism also comprises, opposite control member 36, a part 42 which is attached to the face of cell door 22 facing the inside of cell 10. As is shown more precisely by FIGS. 9A and 9B, this part 42 comprises, on its outer edge facing control member 36, a groove the opposite edges of which form two facing parallel ramps 44. These two ramps 44 guide a rotating roller 46, the shaft of which is attached to the edge of control member 36 facing part 42 which is radially aligned relative to axis of rotation 38 of this member 36. The positioning just described enables the separation or pulling-away of double door 25 to be controlled by rotating control member 36 in an anticlockwise direction, from the perspective of FIG. 2, and closure of the double door to be controlled by rotating control member 36 in an anticlockwise direction.

The centralised control mechanism in accordance with the invention also comprises a number of incorporated safeties, taking the form of bolts, which will now be described.

The function of a first bolt 48 (FIGS. 9A and 9B) is to block control member 36 in an extreme closed position, in which cell door 22 plugs cell flange 18 in a sealed manner. This first bolt 48 comprises a moving blocking member 50 which is installed on part 42 such that it is able move perpendicularly to the axis of cell door 22 supporting this part 42, between a normal blocking position of control member 36 and an unlocked position of this member. Blocking member 50 is formed by a rod one end 50.1 of which will penetrate in a slot 51 made in control member 36 (FIG. 3A) in the locked position. A spring (not represented) acts so as to cause rod 50 to penetrate in part 42. A control rod 52 is installed such that it is able to slide in a through-hole 53 of cell door 22 and in a blind hole 55 of part 42, parallel to the axis of cell door 22. Control rod 52 has a first longitudinal end 52.1 pointing towards the outside of cell 10, which is configured to protrude from the face of cell door 22 facing the outside. A spring 54 is installed compressed between a second longitudinal end 52.2 opposite first longitudinal end 52.1 of control rod 52 and a base of blind hole 55 of part 42, so as to push first end 52.1 of control rod 52 towards the outside of cell door 22. Second longitudinal end 52.2 of control rod 52 comprises a ramp which will cooperate with a second end 50.2 of blocking member 50 such that when control rod 52 protrudes from door 22 towards the outside of the cell the control member is kept pushed away towards the outside of the door and end 50.1 protrudes radially towards the outside of door 22, to prevent the control member moving in an opening direction.

Figures 9A, 9B:
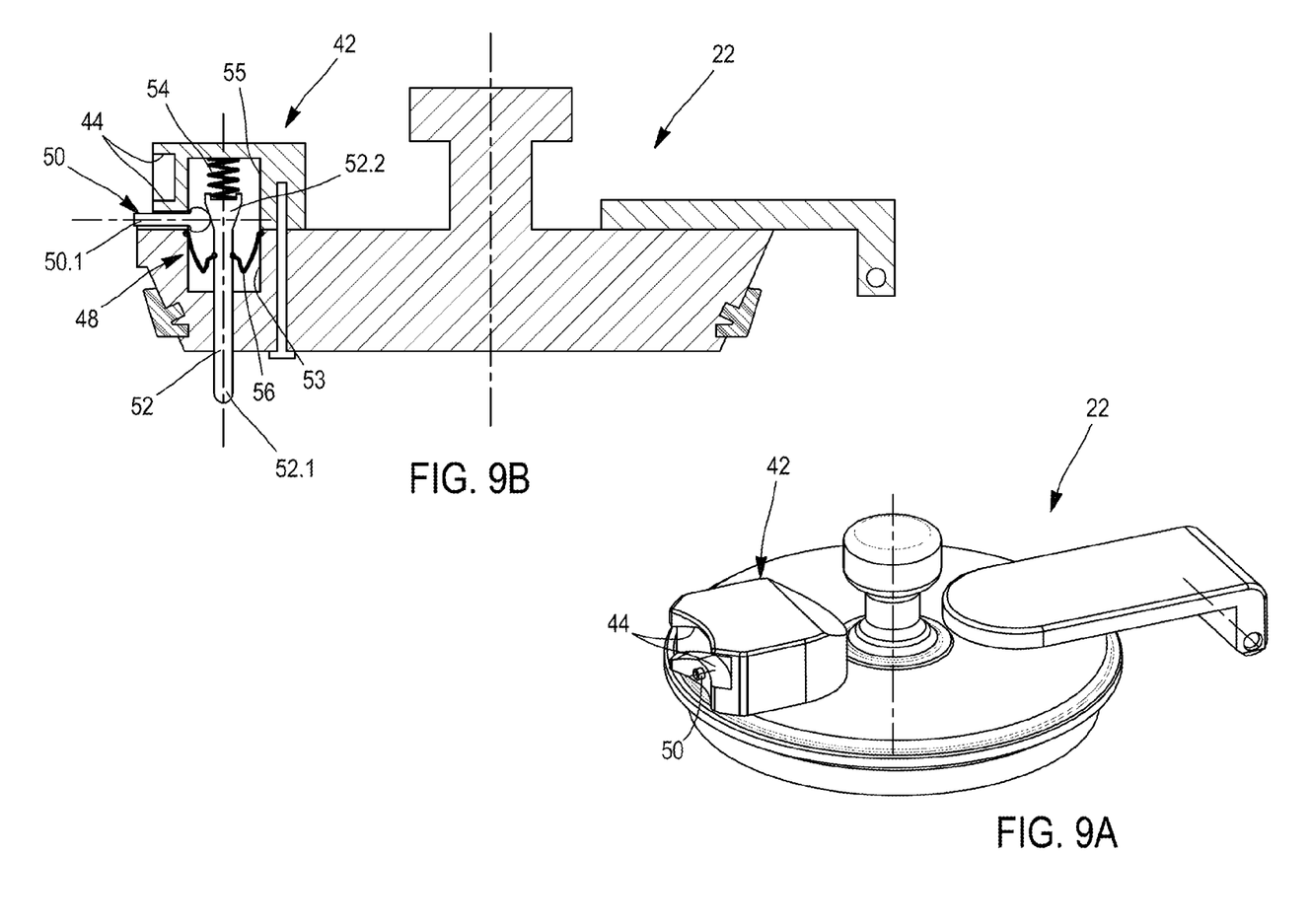
FIG. 9A is a view from beneath the cell door.
FIG. 9B is a schematic section view of the door of the cell along line A-A.

When a container 12 fitted with its container door 24 is positioned against cell flange 18, container door 24 is pressed on first longitudinal end 52.1 of control rod 52, which is pushed against spring 54, the effect of which is to separate the ramp from blocking member 50, and therefore to release this member, which slides inside part 42 away from control member 36, under the effect of the spring. First bolt 48 is then in its unlocked state, since end 50.1 of the control member is released from window 51, and control member 36 is then unlocked. As is also illustrated by FIG. 9B, the seal of cell door 22 is advantageously maintained by placing a sealing member 56 between it and control rod 52 which traverses it.

The safeties integrated in centralised control mechanism 28 also comprise a second bolt 62 (FIGS. 5, 7A and 7B), the function of which is to keep movable control member 36 blocked in its closed state until container flange 20 is completely securely attached to cell flange 18 by bayonet connection 32.

Figure 5:
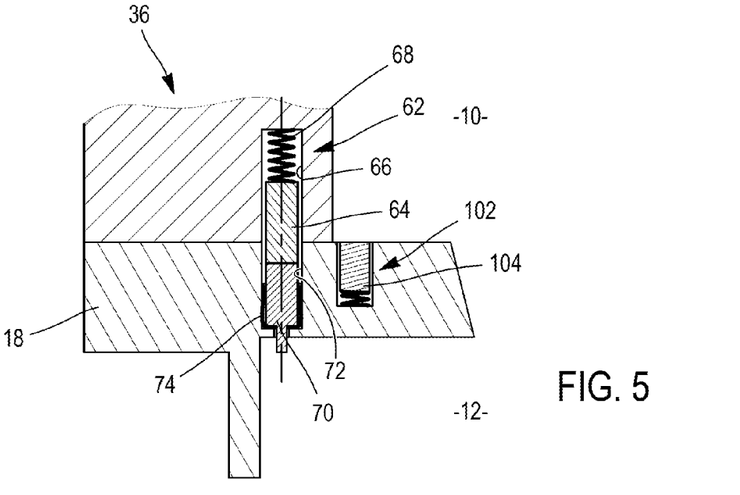
FIG. 5 is a schematic section view along line B-B.
Figure 7A:
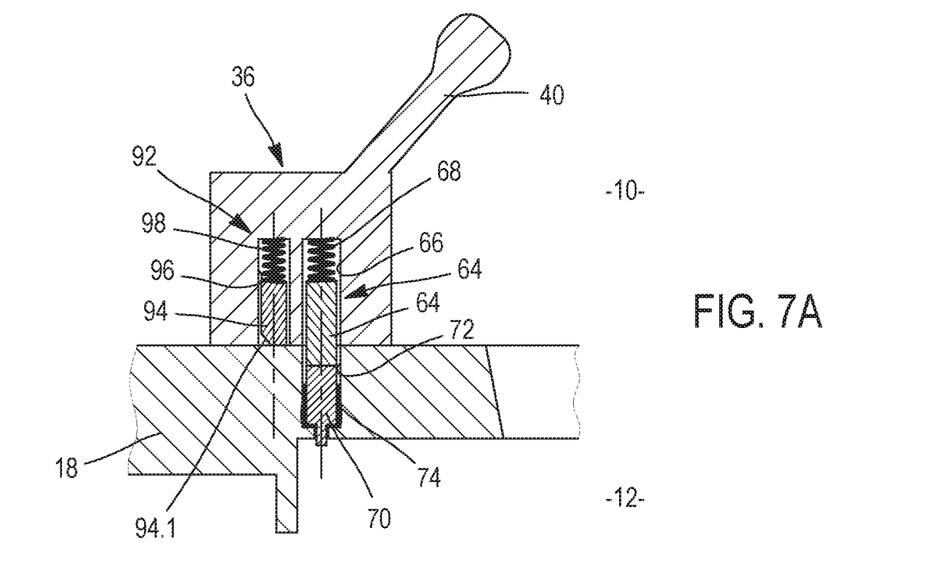
FIG. 7A is a schematic section view along line D-D.
Figure 7B:
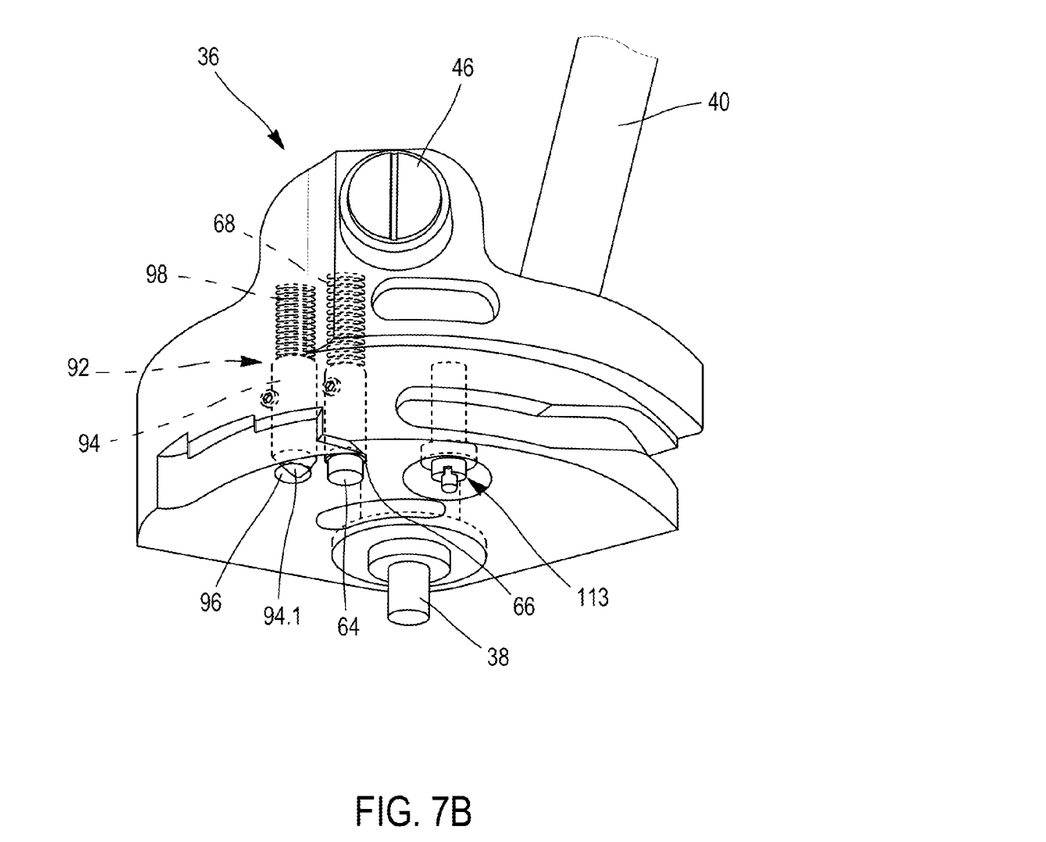
FIG. 7B is a perspective view of the isolated control member.
Figure 7C:
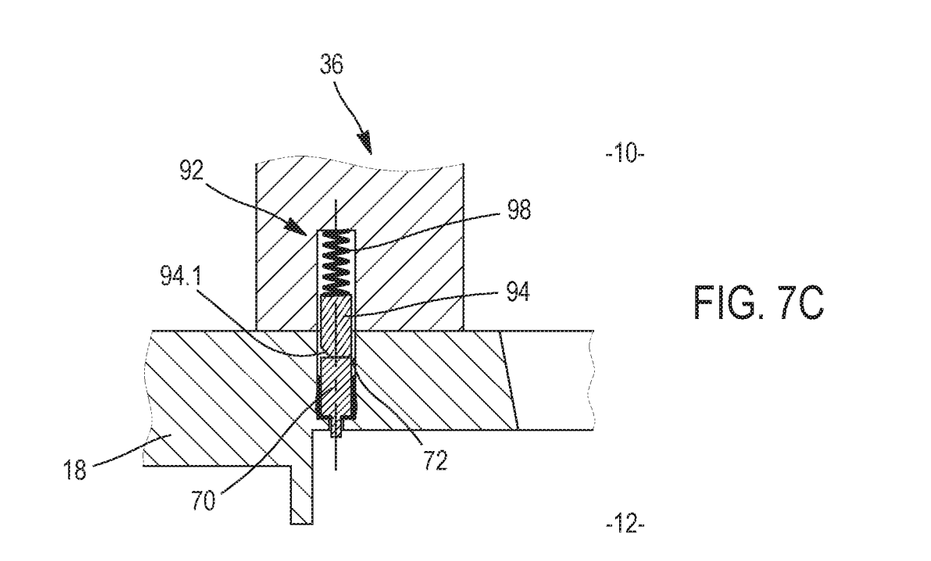
FIG. 7C is a schematic detailed section view of the protective bolt in a locked state.
Figure 8:
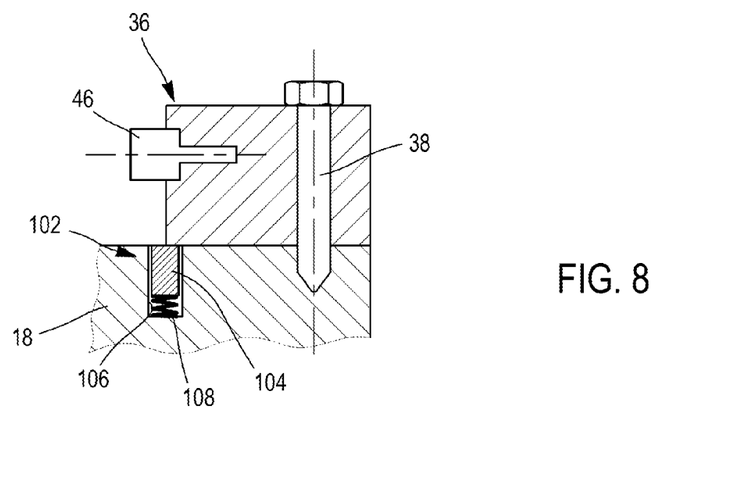
FIG. 8 is a schematic section view along line E-E.

This second bolt 62 firstly comprises a blocking rod 64, which is installed such that it is able slide in a blind hole 66 formed in control member 36 parallel to its swivel pin 38. The open end of this blind hole 66 is facing cell flange 18 and a helical compression spring 68 is positioned between blocking rod 64 and the bottom of hole 66. This spring 68 keeps blocking rod 64 permanently pressed against the face of cell flange 18, facing the inside of cell 10.

Second bolt 62 also comprises a control rod 70 which slides into in a through-hole 72 made in cell flange 18, parallel to the axis of the opening delimited by this flange. The diameter of this through-hole 72 is identical to that of blind hole 66, and it is aligned with the latter when control member 36 is in the previously defined closed position. Under these circumstances, and as illustrated in FIGS. 5 and 7A, spring 68 simultaneously pushes rods 64 and 70, such that rod 64 is partially located in each of these two holes. This blocking position is determined by a limit stop (not represented) of rod 70. The effect of the position then occupied by blocking rod 64 is to prevent control member 36 from rotating around its axis 38. A sealing member 74 (FIGS. 5 and 7A) is interposed between rod 70 and cell flange 18, to maintain the latter's seal. In the position in which control member 36 is blocked by second bolt 62, the end of control rod 70 facing the outside of cell 10 protrudes from beyond one face of cell flange 18 emerging in a groove of this flange able to receive a container lug 20, where this groove and this lug belong to bayonet connection 32. More specifically, rod 70 then protrudes in the abovementioned groove, in a position such that the assembly formed by the two rods 70 and 64 is pushed against spring 68 only when bayonet connection 32 is completely locked.

When the two flanges of bayonet connection 32 are completely securely attached, the two rods 70 and 64 are pushed against spring 68 such that the mating surface between these two rods is merged with the mating surface between cell flange 18 and movable control member 36. Member 36 is then consequently able to rotate around its axis 38. Bolts 48 and 62 form additional safeties which enable an untimely opening of cell door 22 to be prevented, respectively if a container having no door is positioned against cell flange 18, and if the secure attachment of container flange 20 on cell flange 18 using bayonet connection 32 is not complete.

The safeties integrated in centralised control mechanism 28 also comprise a third bolt 78 (FIGS. 2, 6, 7A, 7B) which will prevent bayonet connection 32 between flanges 18 and 20 from being disconnected when control member 36 is moved in the opening direction of the double door. In addition to this third bolt 78, the movable control member has a dead travel, between its normal closed position and an intermediate locking position of bayonet connection 32, during which the rotation of control member 36 around its axis 38 has no effect on the double door (the corresponding portion of parallel ramps 44 is perpendicular to the axis of cell door 22). During this dead travel, the only effect of rotating control member 36 is to act on third bolt 78 in order to lock bayonet connection 32.

Figure 3A:
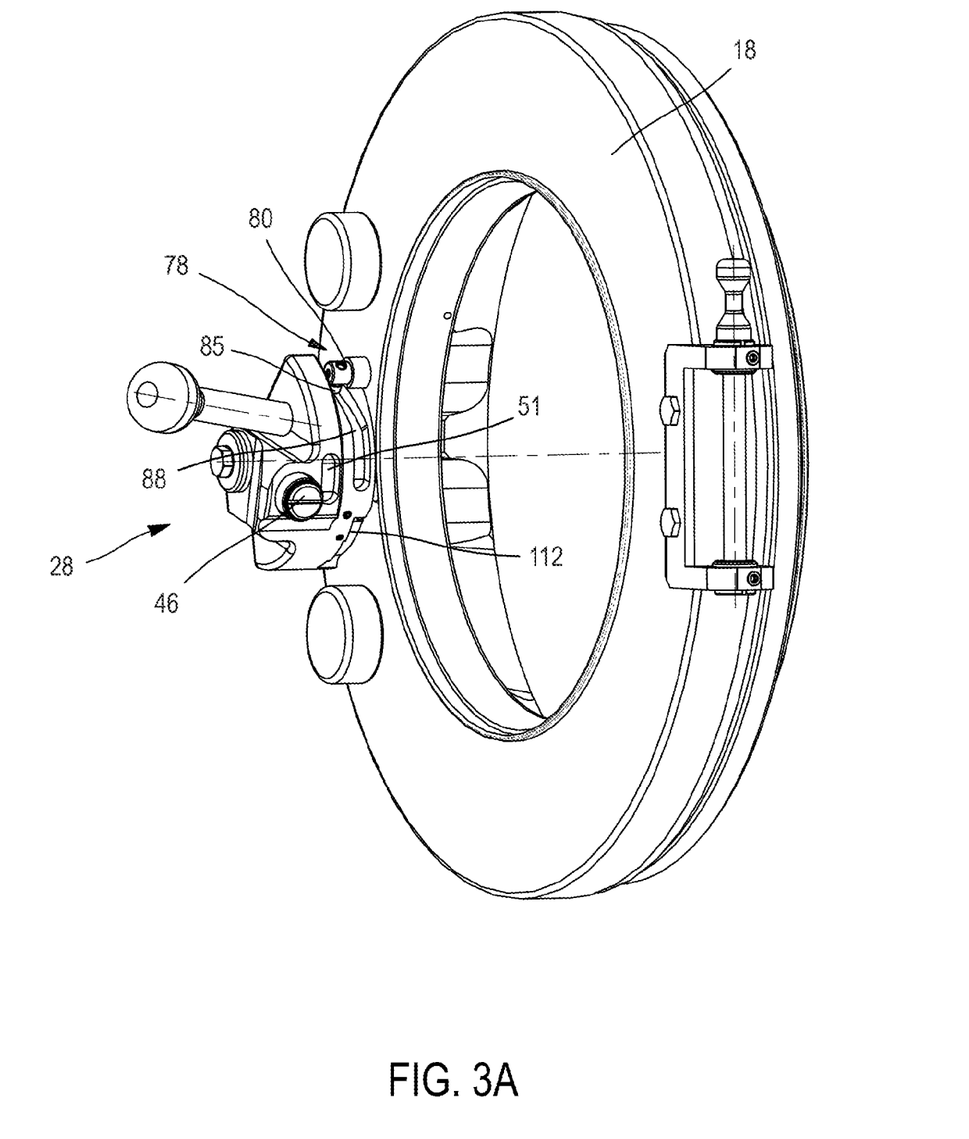
FIG. 3A is a three-quarters perspective view, from inside the cell, of the centralised control mechanism, where the door of the cell is not represented.
Figure 3B:
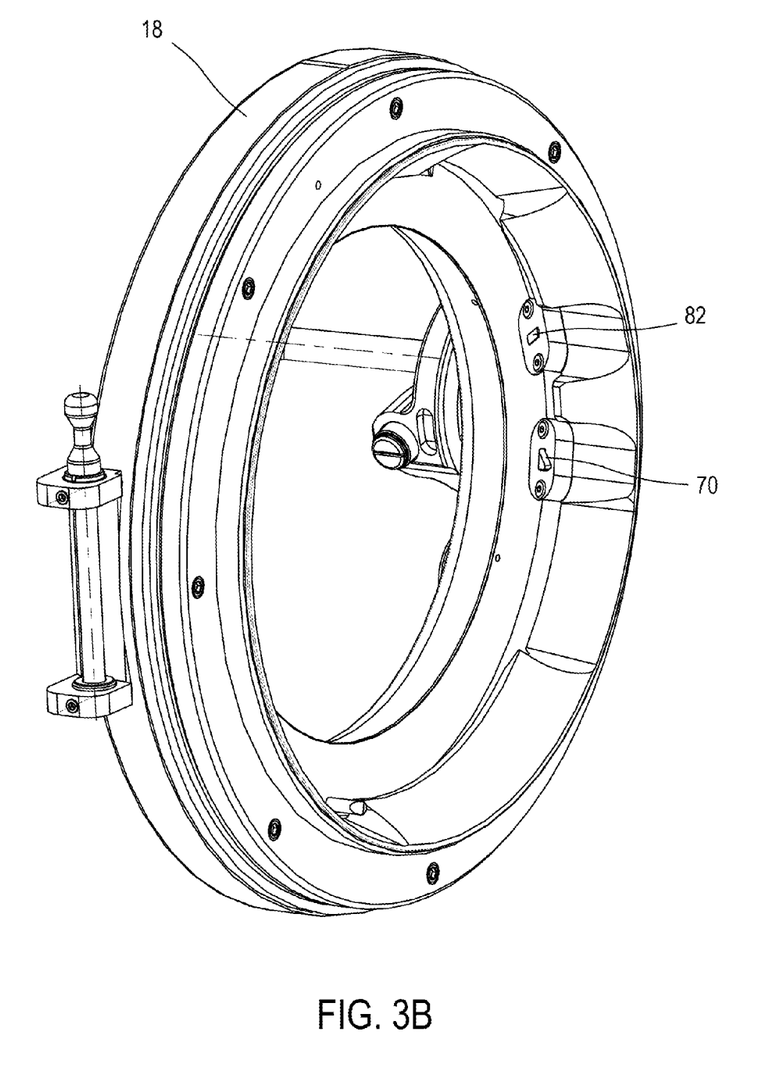
FIG. 3B is a three-quarters perspective view, from outside the cell, of the centralised control mechanism, where the door of the cell is not represented.
Figure 6:
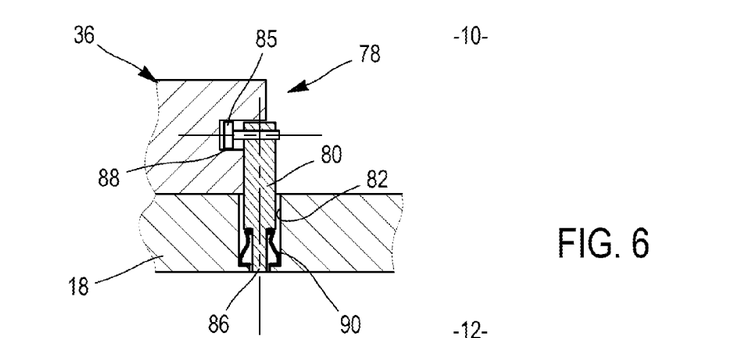
FIG. 6 is a schematic section view along line C-C.

As is illustrated by FIGS. 6 and 3A, third bolt 78 comprises a blocking rod 80 which is installed such that it is able slide in a through-hole 82 formed in cell flange 18 parallel to swivel pin 38. Blocking rod 80 comprises a roller 85 cooperating with a cam race 88 formed in movable control member 36. The cam race comprises two parallel cam surfaces delimiting a groove guiding the roller. The seal of cell flange 18 is maintained by means of a sealing member 90 interposed between this flange and blocking rod 80.

The profile of cam race 88 is such that, when movable control member 36 is in its closed position (FIGS. 6 and 3B), the end of blocking rod 80 opposite head 86 flushes with the face of cell flange 18 facing the exterior of cell 10, in the groove which will receive the lugs of container flange 20 when these two flanges are securely attached using bayonet connection 32. As a variant, it could be possible to have only one cam surface and a compression spring which would permanently press the roller on to the cam surface. This variant enables the required space to be reduced.

When movable control member 36 is rotated from this closed position to the intermediate locking position of bayonet connection 32, cam race 88 moves blocking rod 80 towards the exterior of cell 10. Blocking rod 80 consequently protrudes in the groove of cell flange 18 which is configured to receive the lugs of container flange 20, when movable control member 36 is in its locked position. The position of hole 82 in which blocking rod 80 fits is determined in order that this rod then prevents the lugs formed on container flange 20 from rotating in the direction of disconnection of bayonet connection 32.

The safeties integrated in centralised control mechanism 28 comprise an additional bolt 92, designated in what follows by "protective bolt", enabling any possible movement of control member 36 in a direction of opening to be prevented if the container is removed, or if the container flange leaves its locked position.

The operation of protective bolt 92 is similar to that of the second bolt and is illustrated in FIGS. 7A and 7B Protective bolt 92 comprises a blocking rod 94, which is installed such that it is able slide in a blind hole 96 formed in control member 36 parallel to its swivel pin 38. Blind hole 96 is positioned upstream of blind hole 66 of the second bolt in the control member's opening direction of rotation, and on an arc of a circle centred on the control member's axis of rotation, on which blind hole 66 of the second bolt is also positioned. The open end of blind hole 96 is facing cell flange 18 and a helical compression spring 98 is positioned between blocking rod 94 and the base of blind hole 96. This spring 98 keeps blocking rod 94 permanently pressed against the face of cell flange 18, facing the inside of cell 10.

Blocking rod 94 will cooperate with control rod 70 of the second bolt which slides into through-hole 72 in cell flange 18.

The end of blocking rod 94 sliding on the cell flange advantageously has a bevelled face 94.1 orientated such that it retracts blocking rod 94 upwards when control member 36 is pivoted in the closing direction. Control member 36 can be returned to a closed position whilst waiting for the container and container flange 20 to be returned to their positions, without being hindered by protective bolt 92.

As previously explained, when the two flanges 18, 20 of bayonet connection 32 are completely securely attached, the two rods 70 and 64 are pushed against spring 68 such that the mating surface between the two rods 70 and 64 is merged with the mating surface between cell flange 18 and movable control member 36. Member 36 is then able to rotate around its axis 38. By causing movable control member 36 to pivot from the closed position in the opening direction, cam surface 88 moves blocking rod 80 towards the outside of cell 10, which prevents container flange 20 from being removed. Simultaneously, blocking rod 94 is moved and slides over cell flange 18 and over the end of rod 70 which brushes against the face of cell flange 18. Conversely, if between the position in which movable control member 36 is released such that it is able rotate, and the position in which blocking rod 80 effectively prevents container flange 20 from being removed, a person arrives to remove the container, and therefore to separate container flange 20 from cell flange 18, or if the container flange leaves its locked position, rod 70 falls back into the bottom of hole 72. When blocking rod 94 of protective bolt 92 moves opposite the open end of hole 72 due to the movement of control member 36, the latter, under the effect of spring 98, penetrates partially into hole 72, and thereby blocks any additional rotation of control member 36 for the purpose of opening. Any risk of the cell opening while the container is not in place is thereby prevented.

Protective bolt 92 has the advantage that it is of simple design. Its robustness and its efficacy have been tried and tested, since its structure is similar to the second bolt. In addition, it uses a portion of second bolt 62, which limits the number of additional parts added, and the space, without reducing in any way the efficacy and reliability of second bolt 62. In addition, it can very easily be integrated in controls of a known type, and requires no development of a complete structure.

Very little use will be made of this protective bolt, since the cases in which the container might be withdrawn while the movable control member has started to pivot relate either to a malicious act or to a lack of information as to how the sealed transfer device operates, and there is only a very small risk of this occurring, notably due to the technical fields to which the invention applies. Moreover, the probability of an operator arriving to remove the container is very low, since such an operation is very complex.

In one variant embodiment, protective bolt 92 could comprise its own hole made in the cell flange, and its own rod able to slide in this hole, instead of using hole 72 of second bolt 62.

The safeties integrated in centralised control mechanism 28 comprise, finally, a fourth bolt 102 (FIGS. 5 and 8) which enables any possibility of control member 36 returning from its position of locking of bayonet connection 32 to its position of closure of the double door to be prevented if the action to separate it or pull it away has started. Indeed, if it were possible for movable control member 36 to return the closed position at this stage, an operator could possibly disconnect container flange 20 from cell flange 18 when the double door has been removed.

This fourth bolt 102 firstly comprises a blocking pin 104 (FIGS. 5, 8 and 9) installed such that it is able to slide in a blind hole 106 formed in cell flange 18 parallel to the axis of the opening delimited by this flange, which emerges in the interior of cell 10. A compression spring 108 interposed between blocking pin 104 and the base of blind hole 106 acts so as to move blocking pin 104 towards the interior of cell 10. The position of blind hole 106 is such that it is normally partly plugged by a protrusion of part 42 when cell door 22 is in position. Under these circumstances, blocking pin 104 is completely retracted in hole 106 by its support on a support surface 110 of the protrusion of part 42. Furthermore, a passage groove 112 (FIG. 3A), forming an arc of a circle centred on swivel pin 38, is made in the face of movable control member 36 facing cell flange 18, such that it is positioned opposite hole 106 when the control member is in its locked position, its extreme open position, or in an intermediate position between these two positions. The edges of this trapping groove 112 are straight, such that when the end of blocking pin 104 comes to rest against these edges this completely prevents control member 36 from rotating in the corresponding direction.

As soon as double door 25 separates or is pulled away, due to the cooperation of roller 46 with parallel ramps 44, when movable control member 36 rotates around its axis 38 in an anticlockwise direction from its locked position to its open position, support surface 100 moves away from cell flange 18, such that blocking pin 104 is pushed into trapping groove 112 by spring 108. The effect of the continued rotation of movable control member 36 in the anticlockwise direction is to continue to pull away the double door and cause blocking pin 104 to move along trapping groove 112. The open position is determined by blocking pin 104 coming to a stop against the corresponding end of trapping groove 112. In this position the complementary shapes given to part 42 and to movable control member 36 enable the double door to be pivoted around hinge 26. If an operator then moves movable control member 36 clockwise, blocking pin 94 comes to a stop against the opposite end of trapping groove 112 when the movable control member reaches the locked position of bayonet connection 32. It is, consequently, not possible to move movable control member 36 to the closed position allowing flanges 18 and 20 to be disconnected. To close the double door before disconnecting container 12 from the cell the reverse operations to those which have just been described are undertaken.

Figure 4:
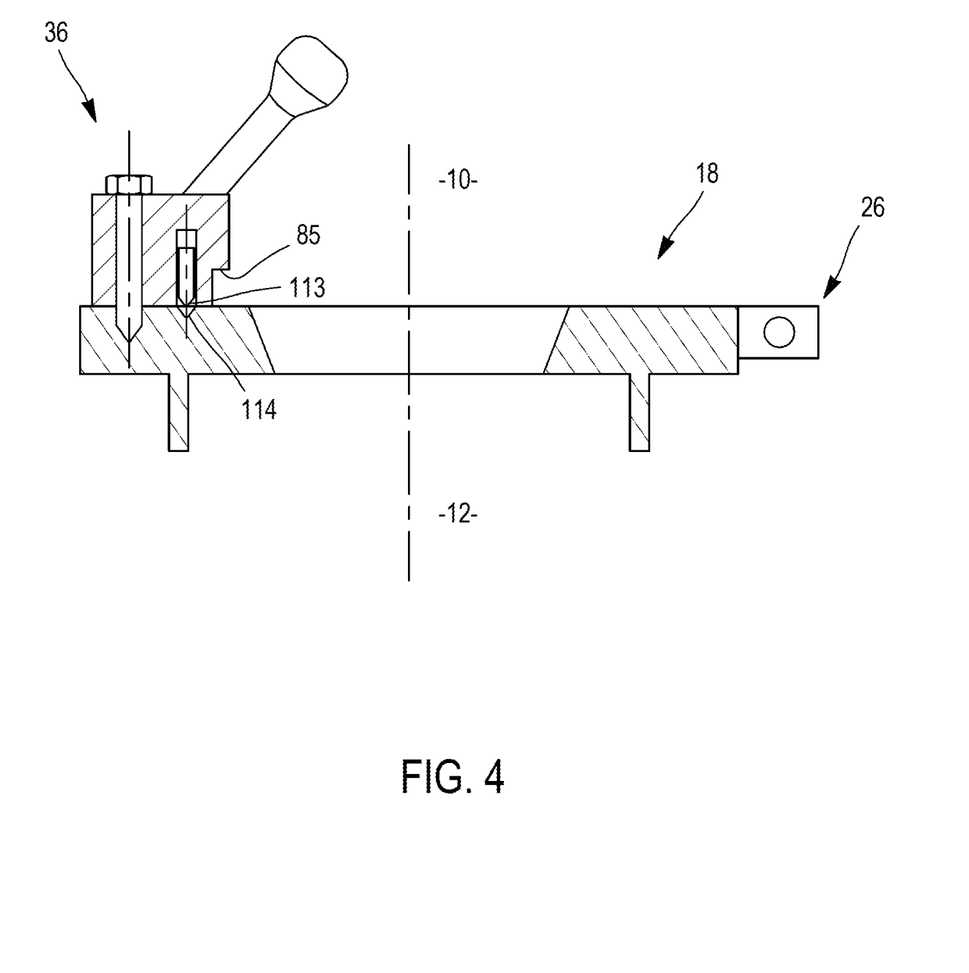
FIG. 4 is a schematic section view of the mechanism of FIG. 2 along line A-A.

In FIGS. 4 and 7B a pusher 113 can be seen installed in the control member and sliding over flange 18, which will cooperate with two recesses 114 made in the face of flange 18 facing the cell. The positions of the recesses are such that one of them corresponds to the closed position and other to the open position, the cooperation of the pusher and of one or other of the recesses forms a hard spot for the operator, who is then informed that they have reached one or other of the closed or open positions, and keeps control member 36 in position.

The different safeties integrated in the centralised control mechanism in accordance with the invention can of course take forms which are different to those which have been described, without going beyond the scope of the invention. In addition the control member may slide rather than rotate. In this case, blocking rod 94 would be positioned in the same plane as the one containing blocking rod 64 and rod 70, whatever the position of the control member may be.

The invention claimed is:

1. A centralised control mechanism, with integrated safeties, in combination with a first closed space for the sealed transfer between the first closed space and a second closed space, the first closed space comprising a first flange and a first door, the first flange can be securely attached to a second flange of the second closed space by a first bayonet connection, and a first door normally plugging an opening delimited by the first flange wherein the first door can be securely attached to a second door of the second closed space by a second bayonet connection, the control mechanism comprising:

a movable control member installed on the first flange such that it is able to move between a closed position and an open position, passing through an intermediate locking position, a system of ramps interposed between the control member and the first door, in order to separate the first and second doors from the first and second flanges when the control member moves from its locking position to its open position, a first bolt assembly normally blocking the control member in its closed position when in a locked state, and which is automatically placed in an unlocked state by the presence of the second door against the first door, a second bolt assembly normally blocking the control member in its closed position when in a locked state, and which is automatically placed in an unlocked state when the second flange is securely attached to the first flange by the first bayonet connection, a third bolt assembly which is normally in an unlocked state when the control member is in its closed position, and which is automatically placed in a locked state so as to block the first bayonet connection in a condition of secure attachment of the first and second flanges when the control member is moved between its locking position and open position, a fourth bolt assembly, which is normally in an unlocked state when the control member is in its locking position, and which is automatically placed in a locked position to prevent the control member from returning to its locking position, after the control member has been moved towards the open position and after the first and second doors are separated from the first and second flanges by the cooperation between the control member and the system of ramps, and a protective bolt assembly which is normally in an unlocked state in the closed position and in the open position of the control member, and which blocks the control member in a locked state when the second flange is not securely attached to the first flange between the time when the second bolt assembly is in the unlocked state, and before the time when the third bolt assembly blocks the first bayonet connection, so as to prevent the first door from opening.

2. A control mechanism according to claim 1, in which the second bolt assembly comprises:
a first blocking rod installed such that it is able to slide in a hole of the control member,
a first elastic member which acts so as to move the first blocking rod towards the first flange, such that the first blocking rod is partially inserted in a through-hole formed in the first flange, when the control member is in its locking position; and a second control rod installed such that the second control rod is able to slide in the through-hole in such a way that it protrudes from one face of the first flange facing the second flange so as to be in a position such that the second control rod is pushed by the second flange, allowing the control member to rotate when the first and second flanges are securely attached to one another by the first bayonet connection.

3. A control mechanism according to claim 2, in which the protective bolt assembly comprises:
a third blocking rod installed such that it is able to slide in a third hole of the control member,
a third elastic member acting so as to move the third blocking rod towards the first flange, the third blocking rod and the third hole being positioned upstream of the first blocking rod in the direction of opening of the control member, such that the third blocking rod is partially inserted into the through-hole of the first flange, when the control member is in an intermediate position between its locking position and its open position and the second flange is not completely locked in rotation on the first flange by the first bayonet connection.

4. A control mechanism according to claim 3, in which the third blocking rod comprises:
a longitudinal end pointing towards the first flange, said longitudinal end having a face which is inclined such that said face causes the third blocking rod to be retracted into the control member when the control member moves towards its closed position.

5. A control mechanism according to claim 1, in which the first bolt assembly comprises:
a first blocking member supported by the first door on a side opposite the second door, the first blocking member being configured to cooperate with said control member, and
a control rod able to cooperate with the first blocking member so as to block the control member in its locking position when the second door is not present.

6. A control mechanism according to claim 1, in which the third bolt assembly comprises:
a second blocking rod installed such that it is able to slide in a second hole of the first flange,
at least one cam surface being formed in the control member, against which a first end of the second blocking rod is pressed, such that a second end of the second blocking rod is concealed in the second hole when the control member is the locking position, and protrudes from one face of the first flange facing the second flange such that the second end of the second blocking rod blocks the first bayonet connection between the first and second flange when the first and second flange are securely attached, when the control member is between the locking and open positions.

7. A control mechanism according to claim 1, in which the fourth bolt assembly comprises:
a blocking pin installed such that it is able slide in a hole of the first flange,
an elastic member acting so as to press the blocking pin against a face of the control member, and
a trapping groove formed in the face of the control member, such that the trapping groove is positioned opposite the blocking pin when the control member is between the locking and open positions or in one of these positions, and a support surface being connected to the first door, so as to completely holding the blocking pin in the hole of the first flange until the first door is separated from the first flange.

8. A control mechanism according to claim 1, in which the system of ramps comprises two parallel ramps, facing one another and connected to the first door, and a roller supported by the control member so as to cooperate simultaneously with these two parallel ramps.

9. A control mechanism according to claim 7, in which the system of ramps comprises two parallel ramps, facing one another and connected to the first door, and a roller supported by the control member so as to cooperate simultaneously with these two parallel ramps, wherein the support surface and the parallel ramps are formed on a part which can be attached to one face of the first door opposite the second door and wherein the part also supports the first bolt.

10. A control mechanism according to claim 1, in which the control member is a pivoting member, installed on one face of the first flange opposite the second flange by a swivel pin.

11. A control mechanism according to claim 3, in which the control member is a pivoting member, installed on the one face of the first flange opposite the second flange by a swivel pin and in which the first blocking rod and the third blocking rod are positioned at the same distance from an axis of rotation of the control member.

12. A control mechanism according to claim 1, in which the control member is fitted with a manual control lever.

* * * * *